United States Patent [19]

Langen

[11] Patent Number: 4,720,621
[45] Date of Patent: Jan. 19, 1988

[54] METHOD AND APPARATUS FOR REMOVING IMPURITIES FROM METALLIC OBJECTS

[76] Inventor: Robert Langen, Quienstrasse 29, D-6600 Saarbrücken, Fed. Rep. of Germany

[21] Appl. No.: 702,529

[22] Filed: Feb. 19, 1985

[30] Foreign Application Priority Data

Feb. 17, 1984 [DE] Fed. Rep. of Germany ....... 3405700

[51] Int. Cl.⁴ .............................................. B23K 26/00
[52] U.S. Cl. .................. 219/121 L; 219/121 LM; 219/121 LB; 219/121 LJ; 219/121 LH; 219/121 FS
[58] Field of Search ................... 219/121 LA, 121 LB, 219/121 LH, 121 LE, 121 LJ, 121 LF, 121 LM, 121 LQ, 121 L, 121 LX, 121 LZ, 121 FS, 121 LU, 121 LV, 121 LW; 34/1, 21

[56] References Cited

U.S. PATENT DOCUMENTS

| | | | |
|---|---|---|---|
| 3,689,159 | 9/1972 | Taniguchi et al. | 219/121 LX |
| 3,700,850 | 10/1972 | Lumley et al. | 219/121 LY X |
| 3,790,744 | 2/1974 | Bowen | 219/121 LM X |
| 3,795,784 | 3/1974 | Moll et al. | 219/121 LB X |
| 3,848,104 | 11/1974 | Locke | 219/121 LW X |
| 4,125,755 | 11/1978 | Plamquist | 219/121 LB X |
| 4,220,842 | 9/1980 | Stürmer et al. | 219/121 LM |
| 4,315,133 | 2/1982 | Morgan et al. | 219/121 FS |
| 4,324,972 | 4/1982 | Furrer et al. | 219/121 LG X |
| 4,368,080 | 1/1983 | Langen et al. | 219/121 LM X |
| 4,379,218 | 4/1983 | Grebe et al. | 219/121 EM X |

FOREIGN PATENT DOCUMENTS

| | | | |
|---|---|---|---|
| 0122175 | 7/1983 | Japan | 219/121 LM |
| 2061164 | 5/1981 | United Kingdom | 219/121 LH |

*Primary Examiner*—C. L. Albritton
*Attorney, Agent, or Firm*—Peter K. Kontler

[57] ABSTRACT

A laser beam which is caused to impinge upon and evaporate rust and/or other oxidation products from the surface of a metallic object is reflected by the exposed surface upon evaporation of impurities and the intensity of the reflected beam is monitored by a detector whose signals are utilized to vary the intensity of the impinging beam, to vary the area of the spot where the beam impinges upon the object and/or to effect relative movements between the impinging beam and the object.

24 Claims, 4 Drawing Figures

Fig. 1

METHOD AND APPARATUS FOR REMOVING IMPURITIES FROM METALLIC OBJECTS

BACKGROUND OF THE INVENTION

The present invention relates to a method and apparatus for removing impurities, especially rust, from metallic objects. The method of the present invention constitutes an improvement over and a further development of the method which is disclosed in U.S. Pat. No. 4,368,080 granted Jan. 11, 1983 to Robert Langen et al.

The method which is disclosed in the patent to Langen et al. involves removal of oxidation products, especially rust, from metallic objects, particularly objects which contain or consist of iron or steel. The patented method involves the steps of focusing a laser beam upon rust to heat the rust to evaporation temperature and to thereby effect evaporation of rust from the surface of the metallic object. It has been found that such method is highly effective in that it allows for evaporation of oxidation products without adversely affecting the surface and/or the texture of the material of the object. Once the evaporation of oxidation products from a selected portion of the surface of a metallic object is completed, the thus exposed surface reflects a certain amount of the impinging radiation. The remainder of radiation is converted into heat which is rapidly dissipated by the object in all directions. Thus, short-lasting exposure of a relatively small portion of the object to a relatively large quantity of energy does not immediately lead to localized overheating of the metallic material and can be tolerated in many instances. As a rule, loose particles of rust and/or other oxidation products are mechanically removed in a first step and the remaining oxidation products are thereupon exposed to the action of a laser beam whose intensity is selected with a view to ensure evaporation of all traces of oxidation products but to avoid overheating of the metallic material adjacent to the thus exposed surface of the object. Thus, the rate of energy application to oxidation products is selected in such a way that it ensures total evaporation of rust or the like but to maintains the following heating of the metallic object within acceptable limits. In other words, there is a surplus of energy which is consumed in order to guarantee complete removal of impurities.

OBJECTS AND SUMMARY OF THE INVENTION

An object of the invention is to provide a novel and improved method of economically removing impurities from the surfaces of metallic objects, particularly of removing rust and/or other oxidation products from the surfaces of objects which consist of or contain iron or steel.

Another object of the invention is to provide a method which ensures that the surfaces of the objects are not adversely affected by the radiation which is used to remove impurities.

A further object of the invention is to provide a method which can be resorted to for effective and economical removal of impurities from large, small, stationary, mobile, lightweight or heavy objects.

An additional object of the invention is to provide a method which can be utilized for removal of impurities at a rapid rate and with a high degree of predictability and accuracy.

A further object of the invention is to provide a method which reduces the likelihood of overheating of the objects during removal of impurities from their surfaces.

Still another object of the invention is to provide a novel and improved apparatus for the practice of the above outlined method.

An additional object of the invention is to provide the apparatus with novel and improved means for ensuring economical utilization of coherent radiation.

A further object of the invention is to provide the apparatus with novel and improved means for reducing the likelihood of overheating of objects during removal of impurities from their surfaces and with novel and improved means for preventing overheating of objects at any stage of treatment.

Another object of the invention is to provide a relatively simple, compact and inexpensive apparatus which can be used for removal of impurities from metallic objects without scarring and/or otherwise affecting the appearance and/or quality of the surfaces of the objects.

An additional object of the invention is to provide the apparatus with novel and improved means for effecting relative movements between the impinging beam of coherent radiation and the object or objects.

One feature of the invention resides in the provision of a method of removing impurities from the surface of a metallic object, particularly of removing rust and/or other oxidation products from the surface of an object which contains iron or steel. The method comprises the steps of directing a beam of coherent radiation (particularly a laser beam) against the object to impinge upon and heat the impurities on the surface of the object to evaporation temperature and to thereby effect evaporation of impurities as well as the exposure of the thus cleaned surface to the impinging beam so that the cleaned surface reflects the beam, and regulating the action of the impinging beam upon the object in dependency on changes in the characteristics (particularly intensity) of the reflected beam.

The regulating step can include varying the intensity of the impinging beam and/or the area of the impinging beam at the locus of impingement upon the object in response to and as a function of variations in intensity of the reflected beam. Alternatively, the regulating step can include changing the positions of the impinging beam and the object relative to each other in response to variations in intensity of the reflected beam. The position changing step can include moving the object relative to the impinging beam and/or vice versa.

Instead of changing the positions of the impinging beam and the object relative to each other in response to variations in intensity of the reflected beam, the improved method can comprise an additional step of effecting a movement of the object and the impinging beam relative to each other so that the impinging beam is directed (either continuously or intermittently) against different portions of the object. Such movement effecting step can include simultaneously moving the impinging beam and/or the object in a plurality of different directions (for example, a cylindrical or tubular object can be moved axially and can simultaneously rotate about its axis or the impinging beam can be caused to move along a meandering, zig-zag shaped or other more or less complex path).

The impinging beam can be focused upon the object so that the maximum dimension of the focused beam at the locus of impingement upon the object (and more accurately stated the maximum dimension of the spot where the beam impinges upon the object) is less than or does not appreciably exceed 10 mm.

In accordance with one presently preferred embodiment of the method which can be practiced with particular advantage if the object is stationary, the directing step includes guiding the beam along a fixed first portion of a path which terminates at the surface of the object and guiding the beam along a continuously or intermittently moving second portion of the path so that the beam continuously or discontinuously impinges upon different parts of the object.

The method can further comprise the step of gathering the evaporated impurities and/or of directing a protective gas against the locus of impingement of the beam upon the object.

Another feature of the invention resides in the provision of an apparatus for removing impurities from the surface of a metallic object, particularly for removing rust and/or other oxidation products from an object which contains iron or steel. The apparatus comprises a laser or another suitable source of coherent radiation, means for directing a beam of coherent radiation from the source and against the object to impinge upon and heat the impurities on the surface of the object to evaporation temperature and to thereby effect evaporation of impurities as well as the exposure of the thus cleaned surface to the impinging beam so that the surface is free to reflect the beam, a detector or other suitable means for monitoring the characteristics of the reflected beam, and means for regulating the action of the impinging beam upon the object in dependency on monitored changes in the characteristics of the reflected beam.

The regulating means can include means for varying the intensity of the beam which impinges upon the object and/or varying the size of the spot where the beam impinges upon the object as a function of changes in the intensity of the reflected beam. Alternatively, the regulating means can comprise means for effecting a relative movement between the impinging beam and the object in response to changes in the intensity of the reflected beam.

The apparatus can comprise means for diverting at least a portion of the reflected beam and the monitoring means is then located in the path of propagation of the thus diverted beam. The diverting means can include a mirror having a diverting portion (e.g., a flat surface) making an angle of between about 40 and 50 degrees with the path of propagation of the reflected beam. Alternatively, the diverting means can comprise a relatively small mobile mirror which is located in and moves relative to the path of propagation of the reflected beam.

The diverting means can be dispensed with if the directing means includes means for directing the beam at an oblique angle to a selected portion of the surface of the object so that the path of the reflected beam deviates from the path of the impinging beam.

The apparatus can further include a source of protective gas and means for directing such gas from the respective source to the location of impingement of the beam upon the object.

The aforementioned means for diverting at least a portion of the reflected beam can also comprise ultrasonic transducer means which is installed adjacent to the beam (either the impinging or to the reflected beam) and serves to effect density changes in the atmosphere of the path of the beam with attendant diversion of at least a portion of the reflected beam against the monitoring means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
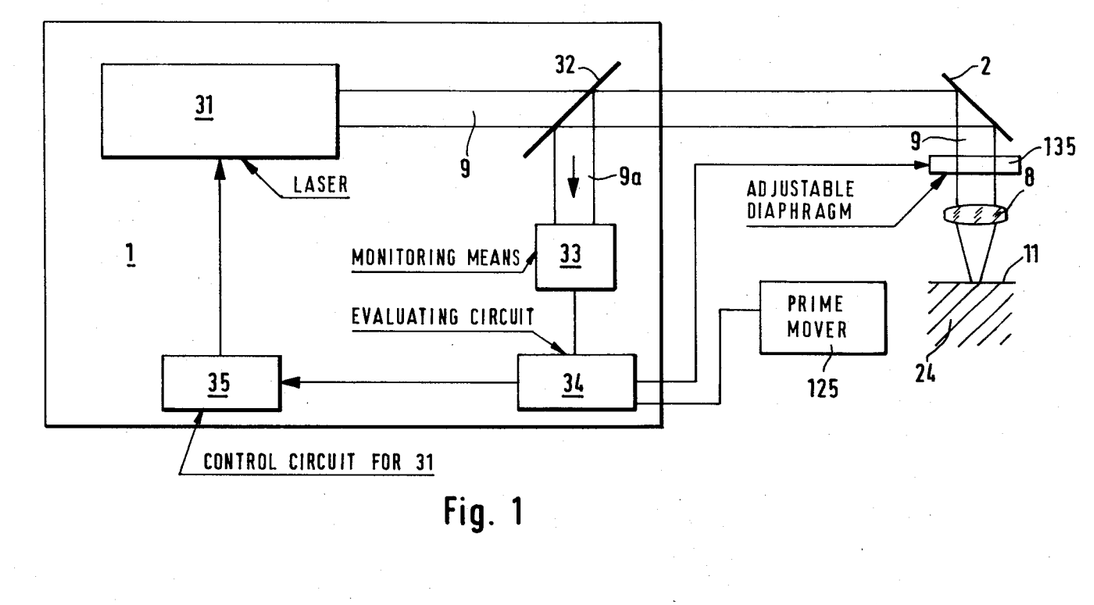
FIG. 1 is a diagrammatic view of an apparatus which embodies one form of the invention and wherein the source of coherent radiation is a laser, the means for diverting some reflected radiation against the monitoring means including a mobile mirror.
Figure 2:
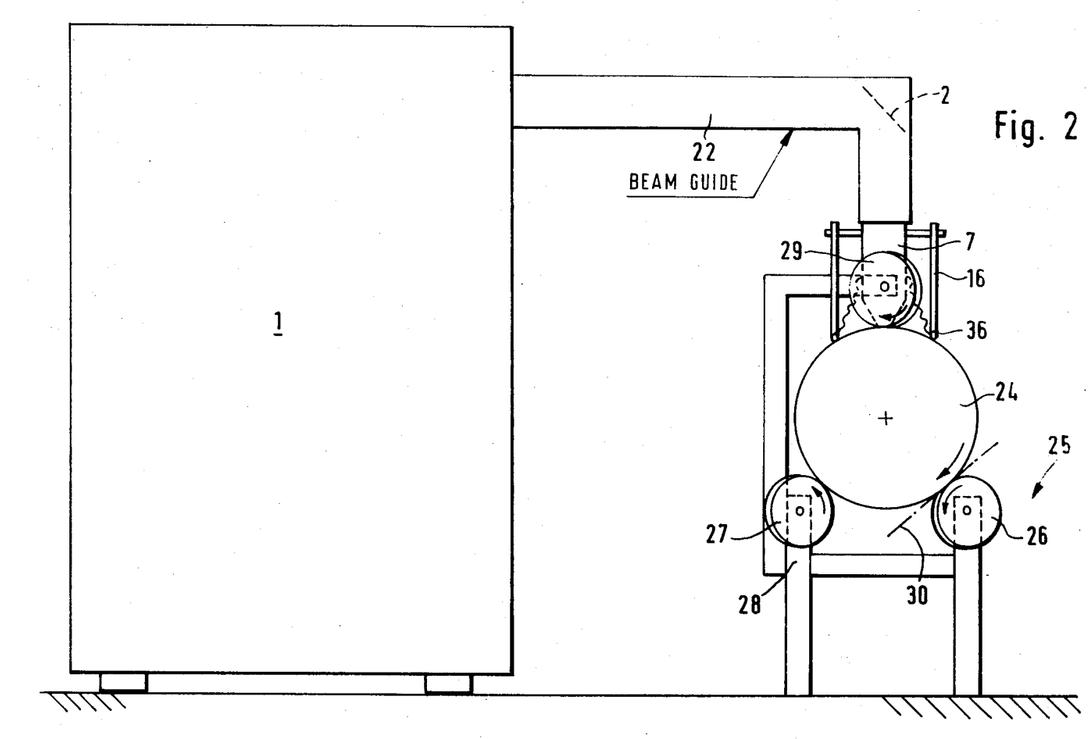
FIG. 2 shows even more diagrammatically the structure of FIG. 1 and the details of means for effecting a relative movement between the impinging beam of coherent radiation and the object.
Figure 3:
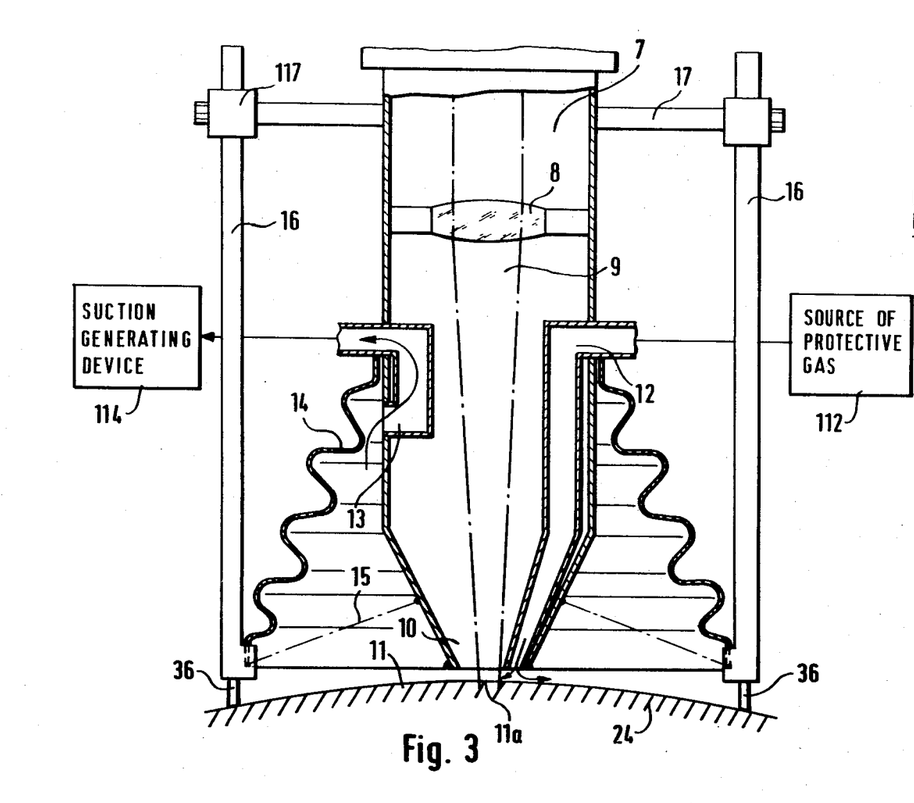
FIG. 3 is an enlarged partially sectional view of a detail in the structure of FIG. 2.

The apparatus which is shown in FIGS. 1 to 3 comprises a laser unit 1 which directs a beam 9 of coherent radiation laterally out of its housing and into a beam guide 22. A mirror 2 in the guide 22 deflects the beam 9 downwardly at an angle of 90 degrees and into a mouthpiece 7 of the guide 22. The mouthpiece 7 has an outlet 10 which is immediately or closely adjacent to the selected portion of the surface 11 of a metallic object 24, such as a pipe which is made of iron or steel and whose exterior is covered with rust. For example, the pipe 24 can have a diameter of approximately 20 cm. The pipe 24 rests on a support 25 which is designed to transport the pipe past the outlet 10 of the mouthpiece 7 at a controlled rate and in such a way that each and every portion of the external surface 11 of the pipe is caused to move into register with the outlet. It is presently preferred to design the support 25 in such a way that it can move any selected increment of the external surface 11 of the pipe 24 along a helical path, i.e., the support 25 imparts to the pipe 24 a composite movement including an axial movement at right angles to the plane of FIG. 2 as well as a preferably simultaneous angular movement about the axis of the pipe. In other words, the beam of coherent radiation which issues from the beam guide 22 via mouthpiece 7 describes on the surface 11 of the rotating and axially moving pipe 24 a series of immediately adjacent (or even partially overlapping) convolutions to thus ensure that the beam can cause evaporation of rust and/or other evaporable impurities from each and every portion of the external surface 11 of the pipe 24. For example, the beam 9 which issues via outlet 10 of the mouthpiece 7 can have a diameter of 5 mm so that it removes from the external surface 11 of the pipe oxidation products in the form of a helical strip having a width of about 5 mm.

The support 25 may be of the type often used for the testing of pipes with ultrasound. In the illustrated embodiment, the support 25 comprises a row of frames 28 each of which carries two sets of rollers 26, 27 (each set can comprise two rollers). The frames 28 are disposed one behind the other, as considered in the axial direction of the pipe 24, and their mutual spacing will depend upon the weight of the pipe and/or other parameters. At least one of the frames 28 further comprises an additional roller 29 which is disposed above the path of the pipe 24 and serves as a means for biasing the pipe against the sets of rollers 26, 27 therebelow. Each biasing roller 29 is preferably disposed midway between the respective sets of rollers 26, 27.

At least some of the rollers 26, 27, 29 are driven in any suitable conventional manner (not specifically shown) so as to rotate in directions which are indicated by arrows. Furthermore, at least those rollers which are driven (e.g., by gear trains, by belt transmissions and/or a combination of two or more types of transmissions receiving motion from a common prime mover or from two or more discrete prime movers) are oriented in such a way that their axes are inclined with reference to the axis of the pipe 24. This is shown, greatly exaggerated, in FIG. 2 of the drawing. The inclination of the axes of driven rollers 26, 27, 29 relative to the axis of the pipe 24 is necessary in order to ensure that the pipe will move axially as well as that the pipe will rotate about its own axis in response to reception of torque from the driven rollers. The axis of the roller 26 which is shown in FIG. 2 is slightly shifted with reference to a plane 30 (indicated by a phantom line) which is tangential to the peripheral surface of the pipe 24 at the locus of contact between such peripheral surface and the roller 26. It will be readily appreciated that the inclination of the axes of the driven rollers 26, 27 and/or 29 relative to the axis of the pipe 24 is relatively small (actually, it is hardly discernible) if the laser beam 9 is to describe along the periphery of the pipe 24 a spiral having convolutions whose width does not exceed 5 mm.

It is preferred to coat the peripheral surfaces of the driven rollers 26, 27 and/or 29 with a suitable layer of friction generating material to ensure that the pipe 24 will be set in rotary and axial motion in response to starting of the prime mover means for the driven rollers or in response to engagement of one or more clutches which are interposed between the prime mover means and the driven rollers. On the other hand, if the support 25 includes driven rollers as well as idler rollers (the axes of the idler rollers are preferably parallel to the axis of the pipe 24), the idler rollers can be provided with coats of friction reducing material so as to ensure that the peripheral surface 11 of the pipe 24 can readily slide relative to the idler rollers while the pipe moves axially.

It is clear that the illustrated support 25 constitutes but one form of the means which can be used to carry as well as to move the metallic object relative to the mouthpiece 7 of the beam guide 22. For example, the rollers 26, 27 and/or 29 or at least some of these rollers can be oriented in such a way that they tend to move the pipe 24 axially at a rate exceeding that which is necessary to ensure impingement of the laser beam 9 upon each and every portion of the peripheral surface of the pipe. The support then further comprises means for limiting the extent of axial movement of the pipe 24 during each of its revolutions so as to again ensure that the laser beam will describe on the periphery of the pipe a helix with convolutions whose width does not exceed the diameter of the laser beam and which are immediately adjacent to each other. For example, the front end face of the pipe 24 can be engaged by a nut which meshes with a feed screw. The feed screw rotates at a speed which is proportional to the rotational speed of the pipe 24 to thus ensure that the nut will travel axially of the feed screw at a rate which is required to ensure impingement of the laser beam upon each and every portion of the periphery of the pipe. The same result can be achieved by temporarily installing in the pipe 24 a feed screw whose axis coincides with the axis of the pipe and which meshes with a stationary nut to ensure that the increments of axial advance of the pipe during each of its revolutions do not exceed the diameter of the laser beam. The pitch of the feed screw is properly related to the desired axial advance of the pipe per revolution.

It is equally within the purview of the invention to provide a support which moves the pipe 24 axially back and forth along the outlet of the mouthpiece 7 and changes the angular position of the pipe whenever the one or the other axial end of the pipe advances beyond the path of the laser beam issuing from the beam guide 22. Analogously, it is possible to rotate the pipe 24 without any axial movement and to shift the pipe axially by an increment of say 5 mm upon completion of each revolution. The illustrated support 25 or an analogous support is preferred at the present time because it renders it possible to move the pipe continuously rather than in stepwise fashion.

The laser unit 1 comprises a source 31 of coherent radiation, e.g., a $CO_2$ laser with a high-frequency excitation in the range of 13.5–27 MHZ and an output of 25 KW. The laser 31 is assumed to emit a beam 9 with a diameter in the range of 50 mm. As mentioned above, the beam 9 is deflected downwardly by the mirror 2 which reflects the entire beam and directs it against a lens 8 in the mouthpiece 7. The lens focuses the beam 9 upon a circular area or spot 11a having a diameter of 5 mm. The spot 11a is located on the peripheral surface 11 of the pipe 24 and the intensity of the beam at the periphery of the pipe 24 is $10^7$ Watts/cm$^2$.

When the apparatus is in use, i.e., when the support 25 is operative to rotate as well as to move the pipe 24 axially at the aforediscussed rate, the impinging beam 9 causes the oxidation products to evaporate in a manner as disclosed in the patent to Langen et al. The thus exposed metallic surface 11 of the pipe 24 thereupon reflects the impinging laser beam 9 upon the mirror 2 which, in turn, reflects the reflected beam 9a against a rotating reflector 32 constituting a means for diverting the reflected beam 9a from the beam 9 that issues from the laser 31. The reflector 32 directs the diverted beam 9a upon a detector 33 which monitors the intensity of the beam 9a and transmits appropriate signals to an evaluating circuit 34. For example, the reflector 32 can constitute or include a copper bar having a diameter in the range of 2 mm which orbits rapidly along a circular path that intersects the path of the reflected beam 9a. Such reflectors and other types of laser beam diverting means are well known in the art.

The detector 33 can constitute a pyro-detector, e.g., a detector which is known in the trade as "Molectron P 3". The evaluating circuit 34 amplifies and processes the signals which are transmitted by the detector 33 and its output signal or signals regulate the operation of the energy source (regulating means) 35 for the laser 31. The nature of signals which are transmitted by the evaluating circuit 34 is such that the intensity of the beam 9 is reduced below the maximum intensity or to zero in dependency on the extent to which the surface 11 of the pipe 24 reflects the beam 9, i.e., on the extent of evaporation of oxidation products from the portion of the surface 11 which is then exposed to the beam 9. The intensity of the beam 9 is or can be reduced to zero when the intensity of the signal from the evaluating circuit 34 denotes that the corresponding portion of the surface 11 is devoid of impurities. The intensity of the beam 9 is increased above zero and, if warranted, to full intensity as soon as the signal from the evaluating circuit 34 denotes that the intensity of the reflected beam 9a is zero or is below a preselected threshold value. The system including the parts 32, 33, 34 and 35 is capable of changing the intensity of the beam 9 within an extremely short interval of time, normally within a few milliseconds. In comparison to the reaction time of the parts 32-35, the rate at which the pipe 24 is moved relative to the mouthpiece 7 is very slow even if the peripheral speed of the pipe is in the range of 40-50 meters per minute or higher.

The dimensions of the spot 11a which is acted upon by the focused laser beam 9 can be varied within a wide range. As a rule, the diameter of such spot will be selected in dependency on the nature of impurities (such as rust) which are to be evaporated from the surface 11 of the pipe 24. In most instances, the diameters of accumulations of rust on pipes which are made of iron or steel are in the range of 1-5 mm.

Experiments with the improved apparatus indicate that a laser beam 9 whose intensity is in the range of $10^7$ Watt/cm$^2$ can be utilized with considerable advantage to rapidly evaporate impurities as well as to avoid overheating, scarring, spotting and/or other damage to the material of the metallic objects. It was further discovered that equally satisfactory or similar results can be achieved if the intensity of the beam is in the range between $10^6$ and $10^8$ Watt/cm$^2$. However, it will be readily appreciated that all of the aforementioned specific data are furnished only by way of example because the treatment of certain metallic objects and/or the treatment of metallic objects at a specific rate might necessitate a slight or even a radical departure from the aforediscussed values and ranges of values. At any rate, the above data are amply sufficient to ensure that one desiring to treat a specific type of metallic object or to treat metallic objects at a given rate will be in a position to rapidly ascertain the optimum values for the intended treatment.

FIG. 3 shows certain additional details of one presently preferred apparatus for the practice of the improved method. The mouthpiece 7 of the beam guide 22 contains the aforementioned lens 8 which focuses the beam 9 upon the surface 11 of the metallic object 24 (or upon the surface of any other metallic object which requires cleaning). The outlet 10 of the mouthpiece 7 is immediately or closely adjacent to the spot 11a on the surface 11 where the focused beam 9 reaches the object 24. A conduit 12 is connected to a source 112 of protective gas and its nozzle discharges such gas at the level of the outlet 10 and directs the stream of gas against the surface 11 in the region of the spot 11a. The inlet of a suction pipe 13 is located within the confines of a bellows or hood 14 which spacedly surrounds the spot 11a and serves to gather the evaporated impurities. The outlet of the pipe 13 is connected to a suitable suction generating device 114. The inlet of the pipe 13 is remote from the outlet 10 and is arranged to draw gases and vapors from the interior of the bellows 14. The open larger-diameter end of the bellows 14 is supported by a frame including rod-shaped distancing members 16, one or more holders 17, and adjustable connectors 117. The holder or holders 17 are rigid with the mouthpiece 7 of the beam guide 22 and the distancing members 16 are adjustable relative to the holder or holders 17 in response to loosening of the connectors 117. The lower end portions of the distancing members 16 (as viewed in FIG. 3) are provided with legs 36 which are made of or are coated with friction reducing material and abut the surface 11 at locations which are spaced apart from the spot 11a in order to maintain the open end of the bellows 14 close to but preferably out of direct contact with the metallic object.

It is equally possible to maintain the metallic object at the standstill and to provide the beam guide 22 with suitable means for swiveling and/or otherwise moving the mouthpiece 7 or another mouthpiece relative to the stationary object in order to clean a selected portion of the surface on such stationary object. For example, the mouthpiece of the beam guide can be designed to lead the focussed laser beam or beams along a meandering, zig-zag shaped or otherwise configurated path. Analogous results can be achieved by providing for the focused beam a pivotable, swiveling and/or otherwise movable mirror which reflects the beam against a stationary surface. Such mode of operation is desirable and advantageous when the object which requires cleaning is bulky or extremely large. By way of example, an apparatus which employs a mobile mirror for focusing the laser beam upon various portions of a metallic object can be used with advantage if the object is the hull of a watercraft or the body of another type of vehicle. Such apparatus can also be used for the treatment of a wide variety of other metallic objects which are too heavy and/or too unwieldy to warrant their shifting relative to the beam guide.

The spot 11a need not be circular. For example, it is possible to direct the focussed beam 9 upon a spot which has a square outline and measures $8 \times 8$ or $10 \times 10$ mm$^2$. Furthermore, the output of the evaluating circuit 34 can transmit signals to suitable means (such as an adjustable diaphragm 135 which is shown schematically in FIG. 1) which varies the cross-sectional area of the focused beam 9 (i.e., the area of the spot 11a) in response to changes in intensity of radiation which is diverted by the mirror 32 and is monitored by the detector 33. Such adjustment of the diaphragm 135 can take place simultaneously with or in lieu of adjustment of the control circuit 35 for the laser 31, i.e., in addition to or in lieu of changing the intensity of the beam 9.

Still further, signals which are transmitted by the evaluating circuit 34 can be used to operate the prime mover 125 for some or all of the rollers 26, 27, 29 so that the prime mover 125 shifts the object 24 relative to the focused beam 9 as soon as a given portion of the surface 11 is relieved of impurities. Such regulation of the prime mover 125 even further reduces the likelihood of the application of excessive energy to successive spots of the surface 11. This not only prevents the beam 9 from affecting the appearance and/or texture of the object but also reduces the energy consumption of the improved apparatus without in any way affecting its effectiveness as a means for reliably removing oxidation products and/or other evaporable impurities from metallic objects.

It can happen that a unit area (spot) of the surface 11 on the pipe 24 or another metallic object includes a first portion which is covered by a reasonably heavy layer of rust or the like and a second portion which is covered with a thinner layer of rust or is not covered at all. If the intensity of radiation is the same in each and every portion of the spot, the second portion of the spot is exposed to excessive radiation during the interval which is required to evaporate rust from the first portion. The diaphragm 135 can be designed and operated in such a way that it not only reduces the cross-sectional area of the focused beam 9 but that it also directs the thus narrowed beam against the first portion of the spot with attendant reduction of the likelihood of excessive exposure of the second portion to radiation issuing from the laser 31. Moreover, even a simple reduction of the cross-sectional area of the impinging beam 9 in the region of the surface 11 to, for example, a circle having a diameter not in excess of 5 mm will reduce the likelihood of localized overheating of the object because the intensity of the beam 9 can be reduced (to zero or to a value between zero and maximum intensity) as soon as the detector 33 ascertains that the extent of reflection of coherent radiation at the exposed surface 11 has exceeded a given threshold value. Still further, by reducing the area of the spot 11a, one can speed up the cleaning operation because, as a rule, the beam 9 does not frequently impinge upon surface portions which are coated with heavy layers of rust or other oxidation products. The control circuit 35 and/or the controls for the diaphragm 135 and/or the controls for the prime mover 125 are preferably designed to increase as well as reduce the intensity of the beam 9, to increase as well as reduce the aperature of the diaphragm 135 and to increase as well as reduce the speed of the prime mover 125.

The differences between the characteristics of impurities and the material of the object which requires cleaning can be so pronounced that it is advisable to increase the intensity of the beam 9 when it impinges upon a portion of the surface 11 which is covered with a relatively thick layer of rust or the like or whereupon the impurities resist evaporation more effectively than on other portions of the surface. Furthermore, it may be desirable or advantageous to reduce the intensity of the beam 9 (even at the risk of prolonging the treatment) when the object is made of a particular material or when the surface of the object should not show any marks which could develop as a result of the treatment with a laser beam. The apparatus can be provided with means for automatically or manually adjusting the intensity of the beam 9 so as to ensure that the intensity of the beam will be best suited for the treatment of a particular material and/or for the evaporation of certain types of impurities. For example, the object which requires cleaning can be coated with different types of impurities which partially overlap each other and each of which offers a different resistance to evaporation. The detector 33 and the evaluating circuit 34 can be readily selected in such a way that a certain intensity of the reflected beam 9a is indicative of total evaporation of all impurities and that a different intensity of reflected radiation is indicative of the presence of one type of impurity as well as of the absence of other impurities. The circuit 34 can then transmit signals which induce the control circuit 35 to change the intensity of the beam 9 so as to ensure rapid but safe and reliable evaporation of the remaining impurity or impurities. Such adjustment of the circuit 35 and of the intensity of the beam 9 can also be effected by hand if the intensity of signals which are transmitted by the detector 33 is displayed on a screen or is denoted by appropriate audible or otherwise detectable signals.

The utilization of a laser unit, 1 which is capable of infinitely or stepwise varying the intensity of the beam 9 between zero and a maximum value is desirable and advantageous if the manufacturer wishes to employ a relatively simple and inexpensive support for the objects to be treated. For example, the prime mover 125 can be operated at a constant speed if the intensity of the beam 9 is variable between zero and a maximum value; this contributes to the simplicity and ruggedness of the support 25. The beam 9 can be turned off or its intensity reduced to a negligible value for shorter or longer intervals of time after the detector 33 transmits a signal denoting that the beam 9 has been directed against a portion of the surface 11 which is not covered with any impurities.

It is also within the purview of the invention to simplify the apparatus to such an extent that it is designed to merely turn the laser 31 on or off in response to signals which are generated by the detector 33 or an analogous detector. Such mode of operation can be quite satisfactory in connection with the treatment of relatively small objects or in connection with impingement of the beam 9 upon relatively small portions of the surface 11.

Still further, the apparatus can be designed in such a way that the detector 33 or another monitoring device monitors the rate of reflection at the surface 11 while the object is moved at a constant rate and the monitoring device transmits signals to a memory which stores information pertaining to the presence of impurities on certain portions of the surface 11 subsequent to initial treatment with the beam 9. The metallic object is then caused to pass along the beam 9 for a second time and the laser 31 is turned on and off by signals from the memory to ensure the evaporation of all those impurities which have continued to adhere to the surface 11 after completion of the initial stage of treatment. Alternatively, signals which are stored in the memory can be used to control the operation of a second apparatus which is in series with the illustrated apparatus and removes impurities only from selected portions of the surface 11 on the once-treated metallic object.

Techniques which can be relied upon to monitor a relatively large portion of the surface 11 (e.g., $8 \times 8$ or $10 \times 10$ mm$^2$), to evaluate the results and to concentrate a beam of coherent radiation upon selected regions of the illuminated area are known from the field of photography and can be applied in connection with the practice of the present method in order to save energy and at the same time ensure adequate irradiation of those parts of the object which carry impurities, which carry thicker layers of impurities and/or which carry different types of impurities. The schematically illustrated adjustable diaphragm 135 constitutes but one of the means for reducing the area of the spot which is being exposed to the action of the beam 9 when the detector 33 or another suitable monitoring device indicates that only a relatively small portion of a larger spot requires treatment or that one or more relatively small portions of the relatively large spot require more intensive treatment. The diaphragm 135 can convert a square, rectangular or other polygonal beam into a beam having an oval or circular outline.

The mirror 32 is preferably positioned in such a way that its reflecting or diverting surface makes with the path of propagation of the reflected beam 9a an angle of between 40 and 50 degrees. This mirror can be designed to permit passage of the entire beam 9 and to divert only a relatively small portion of the reflected beam 9a toward the detector 33. The term "mirror" as used in connection with the part 32 is intended to embrace all kinds of devices which are capable of diverting some or all of the reflected radiation from its path and against a suitable monitoring device. All that counts is to ensure that the detector 33 is exposed to radiation whose intensity suffices to ascertain its characteristics and to allow for the generation of adequate signals which can be used to regulate the intensity of the beam 9 (including a reduction of such intensity to zero), the aperture of the diaphragm 135 and/or the speed of the prime mover 125.

As mentioned above, the mirror 32 can also constitute a relatively small diverting device which is located in the path of propagation of the reflected beam to intermittently or continuously divert at least a portion of the beam 9a toward the detector 33. The means for moving the mirror 32 relative to the path of propagation of the reflected beam 9a is not specifically shown in the drawing. The mirrors 2 and 32 render it possible to direct the focused beam 9 toward the object 24 or toward another object at right angles to the plane of the spot 11a, i.e., at right angles to that portion of the surface 11 which requires treatment by one or more beams of coherent radiation.

However, it is also possible to dispense with the mirror 32 if the beam guide 22 is designed in such a way that the impinging beam 9 is caused to advance along a path making an oblique angle with the plane of the spot 11a, i.e., with that portion of the surface 11 which is about to be exposed to radiation. The surface 11a then reflects the beam 9a at a similar angle and the thus reflected beam 9a can impinge directly upon the detector 33 or another suitable monitoring device.

Figure 4:
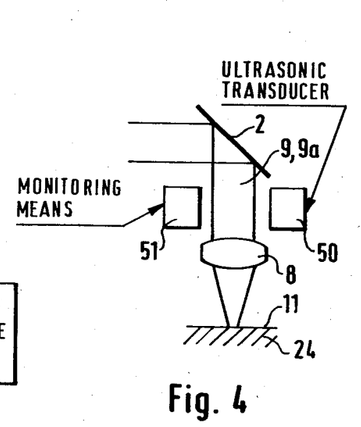
FIG. 4 is a diagrammatic view of a portion of a modified apparatus.

Still further, it is possible to divert or deflect some of the reflected radiation toward a suitable monitoring device by resorting to a commercially available ultrasonic transducer 50 (FIG. 4) which is placed adjacent to the path of propagation of the beam 9 and/or 9a and serves to change the density of the atmosphere in such path so as to ensure that at least some of the reflected radiation reaches the monitoring device 51.

The provision of means (12, 112) for directing a protective (inert or reducing) gas toward the surface 11 in the region of impingement of the beam 9 is desirable and advantageous because it contributes to more reliable detection of the intensity of reflected radiation in the prescribed or desired way and also because the protective gas can be used as a carrier for evaporated impurities which are gathered by the bellows 14 and are evacuated by way of the suction pipe 13.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of removing impurities from the surface of a metallic object, particularly of removing oxidation products from the surface of an object which contains iron or steel, comprising the steps of directing a beam of coherent radiation upon the object to impinge upon and heat the impurities on the surface of the object to evaporation temperature and to thereby effect evaporation of impurities as well as the exposure of the thus cleaned surface to the impinging beam whereby the cleaned surface reflects the beam; and regulating the action of the impinging beam upon the object in dependency on changes in the characteristics of the reflected beam.

2. The method of claim 1, wherein the beam is a laser beam.

3. The method of claim 1, wherein said regulating step includes varying the intensity of the impinging beam in response to variations in intensity of the reflected beam.

4. The method of claim 1, wherein said regulating step includes changing the positions of the impinging beam and the object relative to each other in response to variations in intensity of the reflected beam.

5. The method of claim 4, wherein said position changing step includes moving the object relative to the impinging beam.

6. The method of claim 1, further comprising the step of effecting a movement of the object and the impinging beam relative to each other so that the impinging beam is at least intermittently directed against different portions of the object.

7. The method of claim 6, wherein said movement effecting step includes simultaneously moving the impinging beam and/or the object in a plurality of different directions.

8. The method of claim 1, further comprising the step of focusing the impinging beam upon the object so that the maximum dimension of the focused beam at the locus of impingement upon the object is less than 10 mm.

9. The method of claim 1, wherein said directing step includes guiding the beam along a fixed first portion of a path which terminates at the object and guiding the beam along a continuously moving second portion of the path so that the beam continuously impinges upon different parts of the object.

10. The method of claim 1, further comprising the step of gathering the evaporated impurities.

11. Apparatus for removing impurities from the surface of a metallic object, particularly for removing oxidation products from an object which contains iron or steel, comprising a source of coherent radiation; means for directing a beam of coherent radiation against the object to impinge upon and heat the impurities on the surface of the object to evaporation temperature and to thereby effect evaporation of impurities as well as the exposure of the thus cleaned surface to the impinging beam whereby the cleaned surface reflects the beam; means for monitoring the characteristics of the reflected beam; and means for regulating the action of the impinging beam upon the object in dependency on monitored changes in the characteristics of the reflected beam.

12. The apparatus of claim 11, wherein said regulating means includes means for varying the intensity of the beam which impinges upon the object as a function of changes in the intensity of the reflected beam.

13. The apparatus of claim 11, wherein said regulating means includes means for effecting a relative movement between the impinging beam and the object in response to changes in the intensity of the reflected beam.

14. The apparatus of claim 11, further comprising means for diverting at least a portion of the reflected beam, said monitoring means including detector means located in the path of propagation of the diverted beam.

15. The apparatus of claim 14, wherein said diverting means includes a mirror having a diverting portion making an angle of between about 40 and 50 degrees with the path of the reflected beam.

16. The apparatus of claim 14, wherein said diverting means comprises a mobile mirror which is located in and moves relative to the path of propagation of the reflected beam.

17. The apparatus of claim 11, wherein said directing means comprises means for directing the beam at an oblique angle to the surface of the object so that the path of the reflected beam deviates from the path of the impinging beam.

18. The apparatus of claim 11, further comprising a source of protective gas and means for directing such gas from the respective source to the location of impingement of the beam upon the object.

19. The apparatus of claim 11, further comprising means for diverting at least a portion of the reflected beam against said monitoring means including ultrasonic transducer means disposed adjacent to the beam and arranged to effect density changes in the atmosphere of the path of the beam.

20. The apparatus of claim 11, wherein said source includes a laser.

21. The method of claim 1, wherein said regulating step includes varying the dimensions of the impinging beam in response to a change in the characteristics of the reflected beam.

22. The method of claim 1, wherein the directing step is performed in such a manner that the impinging beam impinges upon the surface of the object substantially at a right angle; and further comprising the step of diverting at least a portion of the reflected beam from the path of the impinging beam.

23. The apparatus of claim 11, wherein said regulating means includes means for varying the dimensions of the impinging beam in response to a change in the characteristics of the reflected beam.

24. The apparatus of claim 11, further comprising means for effecting movement of the object and the impinging beam relative to each other so that the impinging beam is at least intermittently directed against different portions of the object.

* * * * *